Aug. 11, 1936.  H. A. S. HOWARTH  2,050,887
THRUST BEARING
Filed Jan. 14, 1932  6 Sheets-Sheet 4

Inventor
Harry A. S. Howarth.
By
Cameron, Kerkam & Sutton
Attorneys.

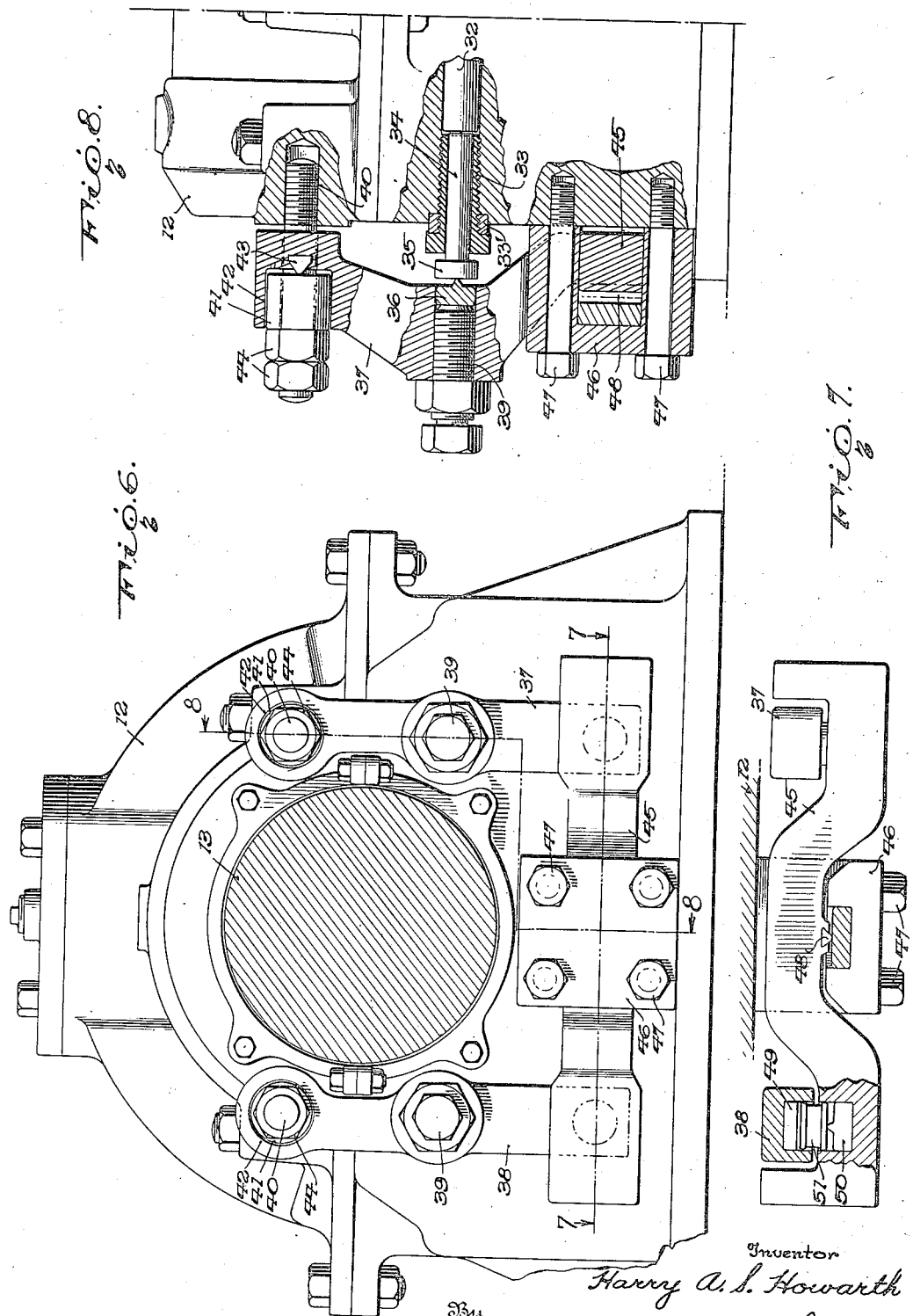

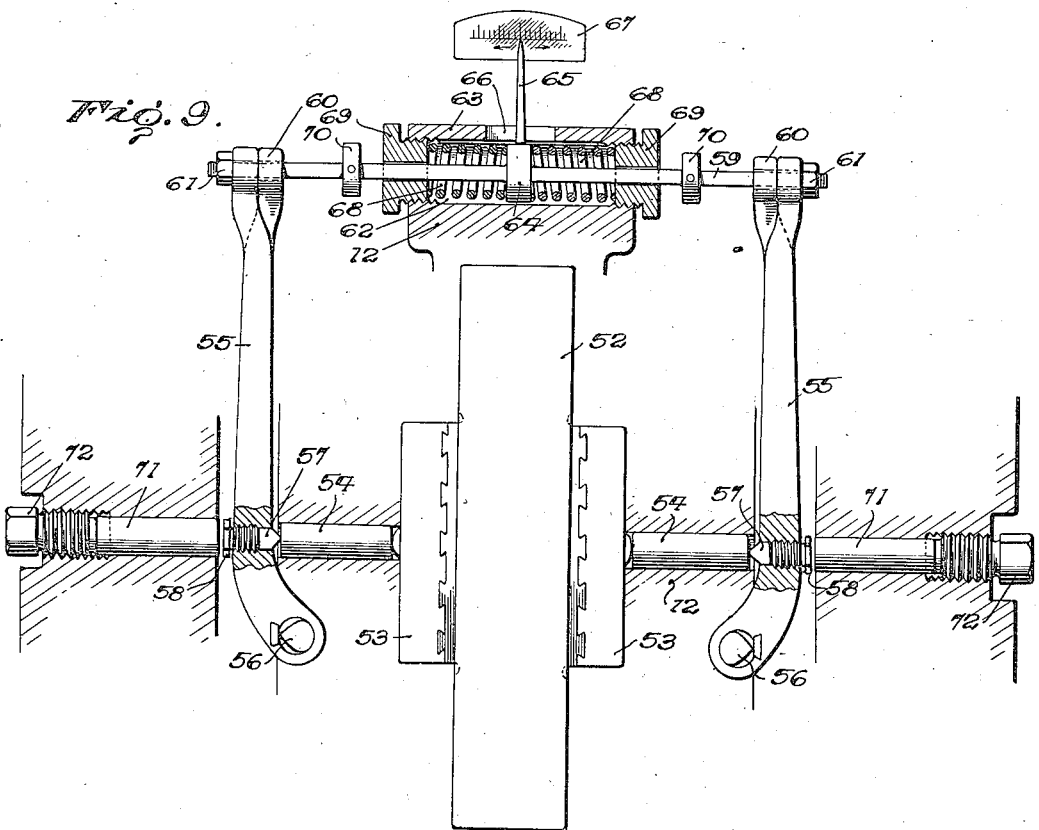

Patented Aug. 11, 1936

2,050,887

UNITED STATES PATENT OFFICE 2,050,887

THRUST BEARING

Harry A. S. Howarth, Philadelphia, Pa., assignor to Kingsbury Machine Works, Inc., Philadelphia, Pa., a corporation of Delaware Application January 14, 1932, Serial No. 586,680

41 Claims. (Cl. 265—1)

This invention relates to bearings and more particularly to thrust bearings and means for equalizing and measuring the thrust loads applied thereto.

One of the objects of the invention is to embody in a thrust bearing novel means for equalizing the thrusts exerted upon the various bearing members thereof, which means are constructionally extremely simple and especially well adapted for cooperation with other mechanism for measuring the thrusts thus equalized.

Another object is to provide a new and improved adjustable two-shoe equalizing thrust bearing which is simple and rugged in structure, economical to manufacture and service, and yet efficient and dependable in operation.

A further object is to provide a thrust bearing with a novel arrangement of simple levers whereby the thrusts exerted upon the various bearing members may be accurately and easily equalized.

Still another object is to provide novel mechanism for measuring and indicating the net thrust load applied to a thrust bearing for a shaft having two directions of rotation.

A still further object is to embody in a thrust bearing for a shaft having two directions of rotation novel means for equalizing the thrusts exerted upon the various bearing members and mechanism associated therewith for measuring and indicating the net amount of the thrust load thus equalized.

Another object is to provide a new and improved equalizing thrust bearing which includes novel means for continuously indicating the operative condition of the equalizing mechanism.

These and other objects will appear more fully from a consideration of the detailed description of the invention which follows. Although several embodiments of the invention are described and illustrated in the accompanying drawings, it is to be expressly understood that these drawings are for the purpose of illustration only and are not to be construed as a definition of the limits of the invention, reference being had for this purpose to the appended claims.

In the drawings, wherein like reference characters indicate like parts throughout the several views—

Fig. 6 is an end view of another embodiment of a thrust equalizing mechanism;

Fig. 7 is a sectional horizontal view of a portion of the embodiment of Fig. 6 taken substantially on the line 7—7 thereof;

Fig. 8 is a sectional side view taken substantially on line 8—8 of Fig. 6 with certain parts shown in full;

Fig. 9 is a diagrammatic side view, with certain parts shown in section, of a mechanism for measuring and indicating net thrust loads; and Figs. 10 and 11 are diagrammatic end views of two forms of thrust transmitting lever arrangements which may be utilized in the embodiment of Fig. 9.

Figure 4:
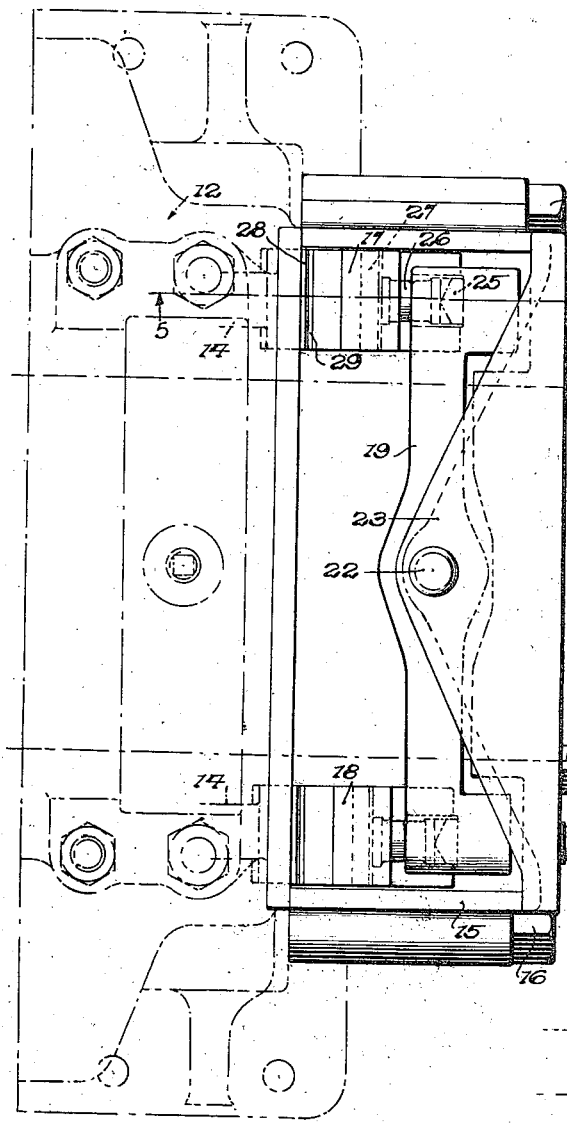
Fig. 4 is a plan view of another embodiment of the invention illustrating a self-contained thrust equalizing device adapted for ready attachment to a thrust bearing, the top of the equalizing mechanism housing being removed.
Figure 5:
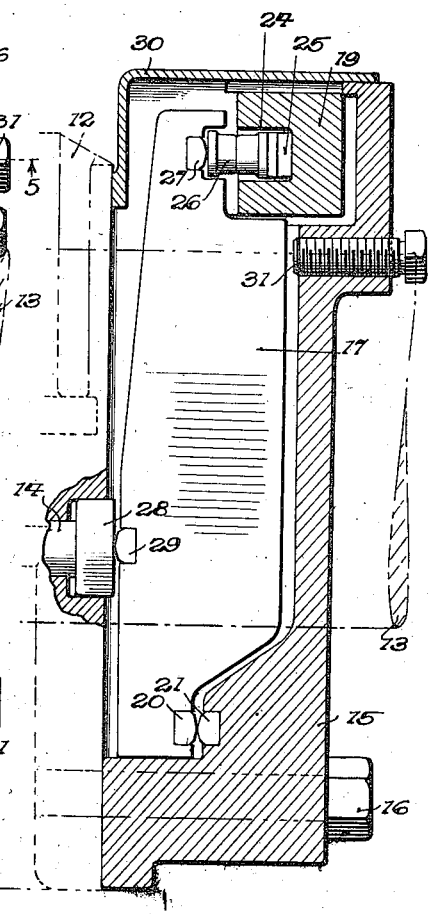
Fig. 5 is a sectional side view taken substantially on line 5—5 of Fig. 4 with certain parts shown in full.

Referring first to Figs. 4 and 5, there is disclosed therein a novel, self-contained, thrust equalizing mechanism which may be attached and detached as a unit to and from a thrust bearing of standard construction as well as embodied in a bearing as originally designed. The mechanism comprises an extremely simple arrangement of levers which may be housed in a casing that can be readily secured to the housing of a standard thrust bearing. The type of equalizing mechanism shown is especially well adapted for use with thrust bearings of the well known Kingsbury type, and more particularly with bearings of this type for horizontal shafts wherein only two thrust receiving bearing members or shoes are utilized for receiving thrust in a given direction, one on each side of the shaft with their centers of pivotal movement preferably disposed substantially in a horizontal plane.

In the embodiment illustrated, 12 indicates the housing for a thrust bearing for a horizontal shaft 13, the thrust bearing being of the usual Kingsbury construction having a pair of bearing shoes in thrust receiving engagement with a thrust collar on shaft 13, each bearing shoe being provided with a thrust pin, indicated at 14, which extends parallel to the shaft to the end of bearing housing 12 where it is normally provided with a jackscrew for adjusting purposes. Where the thrust equalizing mechanism of the present invention is to be used with such a bearing of the usual construction, the jackscrews are removed and an equalizer casing or housing 15 is secured to the end of bearing housing 12 in any suitable manner, as by bolts or screws 16, with the contained equalizing mechanism in position to receive and equalize the thrusts transmitted by pins 14.

As shown, equalizer casing 15 contains a pair of rigid, vertical, thrust transmitting lever members 17 and 18, located on opposite sides of shaft 13 in line with thrust pins 14, and a rigid horizontal equalizing lever 19, extending above and transverse to shaft 13. Each of lever members 17 and 18 is shown as provided adjacent its lower end and in the outer face thereof with a suitable pivot insert 20 which engages a similar insert 21 in the outer wall of housing 15 and forms therewith a fulcrum for said lever member. Equalizing lever 19 is supported in its horizontal position adjacent the top of housing 15 by a suitable pivot pin 22 secured to and depending downwardly from an overhanging portion 23 of housing 15, pivot pin 22 being located substantially in a vertical plane through the axis of shaft 13 and forming a fulcrum for equalizing lever 19 at a point midway between its ends. Equalizing lever 19 is also provided adjacent each end thereof with a suitable recess 24 in which is mounted a pivot insert 25 adapted to engage one end of a thrust transmitting pin 26 the other end of which engages a similar insert 27 carried adjacent the upper end and in the outer face of one of lever members 17, 18, the pivotal axis provided by the latter inserts, however, being positioned at right angles to those of inserts 25. The thrusts from the bearing shoes are transmitted to lever members 17 and 18 at horizontally aligned points intermediate the ends and in the inner faces of said levers through enlarged heads 28 of thrust pins 14 and pivot inserts 29 mounted in the inner faces of said lever members and in engagement with said enlarged heads. A seperately removable cover 30 for equalizer housing 15 completes the assembly.

With this construction, the various thrusts which are exerted upon the two bearing shoes are transmitted through thrust pins 14, enlarged heads 28 and pivot inserts 29 to their respective vertical lever members 17 and 18 which, in response to said thrusts, are urged about their fulcrum points 20, 21, and through the thrust transmitting agencies of pins 26 in turn tend to move equalizing lever 19 about pivot pin 22 in response to said thrusts. Since equalizing lever 19 thus receives simultaneously at its two ends the thrusts from the two bearing shoes, if these thrusts are unequal lever 19 may rotate about its pivot or fulcrum until the thrusts are equalized.

Should, for any reason, it be desired not to utilize the thrust equalizing mechanism thus described, means are provided for rendering said mechanism inoperative at will. In the form shown, this may be accomplished by means of adjustable stop screws 31, one of which is provided for each of lever members 17 and 18, threaded into equalizer housing 15 adjacent the top thereof and in the plane of its associated lever member. By adjusting stop screws 31 to their innermost positions into engagement with the outer faces of lever members 17 and 18, movement of said lever members about their pivots in response to the thrusts exerted upon the bearing shoes is prevented, thereby rendering equalizing lever 19 inoperative.

Another embodiment of this constructionally simple equalizing mechanism is disclosed in Figs. 6, 7 and 8, this embodiment differing from that just described in that the equalizing mechanism is not provided with a housing or casing, but the elements thereof are directly connected to the outside of the thrust bearing housing, the equalizing lever is located below instead of above the shaft, and different means are provided for establishing the fulcrums of the vertical thrust transmitting lever members. As shown, the usual jackscrews for the main thrust pins 32 are removed and replaced by threaded bushings 33 in the form of jackscrews having centrally arranged apertures extending therethrough in which are slidably supported auxiliary thrust pins 34 having enlarged heads 35 normally in thrust transmitting engagement with pivot inserts 36 adjustably mounted in the inner faces of vertical lever members 37 and 38 intermediate the ends thereof. Normally said bushings 33 are positioned with their inner ends out of contact with thrust pins 32 by washers 33' between the heads of said bushings and the casing 12. Each of lever members 37 and 38 is provided with an adjusting screw 39 engaging insert 36 and by means of which the position of the bearing shoes and the other elements of the thrust equalizing mechanism may be adjusted.

Vertical lever members 37 and 38 are supported at their upper ends on studs 40 which pass freely through the upper ends thereof and are threaded into the end of bearing housing 12. Studs 40 also have freely mounted thereon cylindrical sleeves 41 which fit into similar recesses 42 in lever members 37 and 38 and engage at their inner faces pivot inserts 43 mounted in the bases of said recesses. Sleeves 41 and lever members 37 and 38 are held against outward movement on studs 40 by suitable lock nuts 44. Below and extending transversely to shaft 13 is mounted a horizontal equalizing lever 45 in position to receive and equalize the thrusts from the lower ends of vertical lever members 37 and 38. Equalizing lever 45 is supported at its middle portion by a suitable yoke member 46 which may be secured to the thrust bearing housing 12 in any desired manner, as by bolts or screws 47, and is fulcrumed at its mid-point by a pivot insert 48, the edge of which lies substantially in a vertical plane through the axis of shaft 13. The thrust is transmitted from the lower ends of vertical lever members 37 and 38 to the outer ends of equalizing lever 45 through pivot inserts 49 and 50 mounted in the vertical levers and the equalizing lever, respectively, and thrust transmitting pins 51 interposed between said inserts, a construction similar to that previously described in connection with the embodiment of Figs. 4 and 5.

The manner of operation of this embodiment is similar to that described above in connection with Figs. 4 and 5. Should it be desired to render the thrust equalizing mechanism inoperative, this may be done by removing washers 33' and threading bushings 33 inwardly until their inner ends abut the outer ends of main thrust pins 32, thereby removing all thrust from vertical lever members 37 and 38. Bushings 33 will also act as bumpers in case there should be any breakage of the equalizing mechanism.

Referring now to Figs. 9, 10 and 11, there is diagrammatically disclosed therein mechanism for measuring and indicating the net thrust load applied to the shoes of a thrust bearing for a shaft which is adapted to rotate in both directions. In thrust bearings for shafts of this character, bearing members or shoes are provided on both sides of the thrust collar so that the thrust may be taken up irrespective of the direction in which the shaft is rotated. Assuming that the bearing shoes are adjusted sufficiently close against the thrust collar so that when the latter is turning there will be a pressure generated in the oil film formed on each face of the collar, if no thrust load is applied to the shaft, mere rotation thereof will set up equal film pressures on the two sides of the collar. If, however, a thrust load is applied to the shaft, and thus superimposed upon the idling oil film pressures, the total film pressure or thrust against the shoes on one side of the collar will increase and that on the other side will decrease until the net film pressure exactly balances the thrust load. Therefore, if this net film pressure or net thrust upon the bearing shoes is measured, it is a most accurate measure of the true thrust load being applied to the shaft.

In the net thrust measuring mechanism diagrammatically disclosed in Fig. 9, the thrust collar 52 of the shaft is provided on each face thereof with a pair of thrust receiving bearing members or shoes 53 preferably disposed in a horizontal plane, the shoes of each pair being located on the opposite sides of the axis of the shaft. The thrust on each shoe 53 is transmitted by means of a thrust pin 54 and is applied against a suitable lever 55, fulcrumed in thrust bearing housing 12 at 56, through the medium of a pivot insert 57 mounted in said lever and adjustable by means of a suitable screw 58.

Slidably mounted in the bearing housing above and parallel to the axis of the shaft and thrust collar 52 is a longitudinally movable rod or bar member 59 to which all of levers 55 are operatively connected. In the form shown in Figs. 9 and 10, each lever 55 is provided at its upper end with an enlarged eye portion 60 which freely fits over rod or bar member 59, the two levers 55 on each side of thrust collar 52 having their respective eye portions 60 offset so that each may engage member 59 adjacent the other. Each end of member 59 is then provided with a suitable lock nut 61 to maintain the upper ends of levers 55 in their proper positions on said member.

With this construction, rod or bar member 59 will be moved bodily in its longitudinal direction in proportion to the net thrust load existing at all of shoes 53. Although the thrust loads on the two shoes on each side of thrust collar 52 are not equalized, they are added together and applied to member 59 through the medium of levers 55 and nuts 61. Assuming that the main thrust load is exerted against the shoes on the left side of thrust collar 52, as viewed in Fig. 9, the addition of the thrust on these shoes will tend to move member 59 to the left. However, since rod or bar member 59 extends longitudinally of the bearing and is also operatively connected to levers 55 receiving the thrusts existing by reason of any oil film pressures on the shoes on the right side of the collar 52, the sum of the thrusts transmitted to said member from the shoes on the left side of collar 52 is opposed by or has deducted therefrom the sum of the loads which may be generated by the oil films on the right side of the collar against the shoes on that side. The resultant movements of rod or bar member 59 are therefore proportional to the difference between the active thrust load and any opposing load due to oil film pressure, which is commonly called the net thrust load exerted on the bearing.

Suitable means are then provided for indicating the resultant movements of rod or bar member 59 as a measure of the net thrust load. In the form shown, member 59 passes freely through a chamber 62 formed by the top central portion of bearing housing 12 and a cap member 63, and is provided at its mid-point with a collar 64. The movements of member 59 are indicated visually by means of a suitable pointer member 65 secured to collar 64 and projecting outwardly through a suitable opening 66 in cap 63 into registry with a graduated scale 67 calibrated in terms of net thrust load. The member 59 is continually urged toward its normal central no-load position by means of a pair of suitable coil springs 68 housed in chamber 62, one on each side of collar 64. The outer ends of springs 68 abut suitable gland members 69 which are threaded into the ends of chamber 62, thus providing means for adjusting member 59 to its proper no-load position and for originally placing the springs 68 under any desired degree of compression. Member 59 may also be provided with suitable adjustable stop members 70 located just outside of gland members 69 so as to limit the movement of member 59 in case of breakage of any of the parts. With this combination of elements, it is evident that the net thrust load applied to the bearing shoes at any instant is accurately indicated both as to direction and amount by the relative position of pointer member 65 with respect to scale 67.

Suitable means are also provided for rendering the net thrust measuring mechanism inoperative at will. As shown, said means comprise a thrust pin 71 and jackscrew 72 housed in thrust bearing housing 12 in line with each of the thrust pins 54 and adjusting screws 58 of levers 55. Accordingly, if it is desired to render the net thrust measuring apparatus inoperative, it is only necessary to screw in on jackscrews 72 until thrust pins 71 engage the heads of adjusting screws 58, whereupon the thrust load will be transmitted directly through said elements to the thrust bearing housing.

In Fig. 11 there is disclosed a modified form of the thrust transmitting lever arrangement disclosed in Figs. 9 and 10, wherein the two diagonal levers 55 on each side of thrust collar 52 are replaced by a single, inverted U-shaped lever 73 fulcrumed at its lower ends in the same manner as indicated at 56 in Figs. 9 and 10 and provided with the same thrust receiving line-contact inserts 57 and adjusting screws 58 as previously described. The upper central portion, or bight, of each U-shaped lever 73 is provided with a vertical extension 74 having an eye portion 75 freely mounted on rod or bar member 59 similarly to eye portions 60 of the previously described embodiment. This level construction may be used interchangeably with that of Figs. 9 and 10 in net thrust measuring mechanisms of this character.

Figure 1:
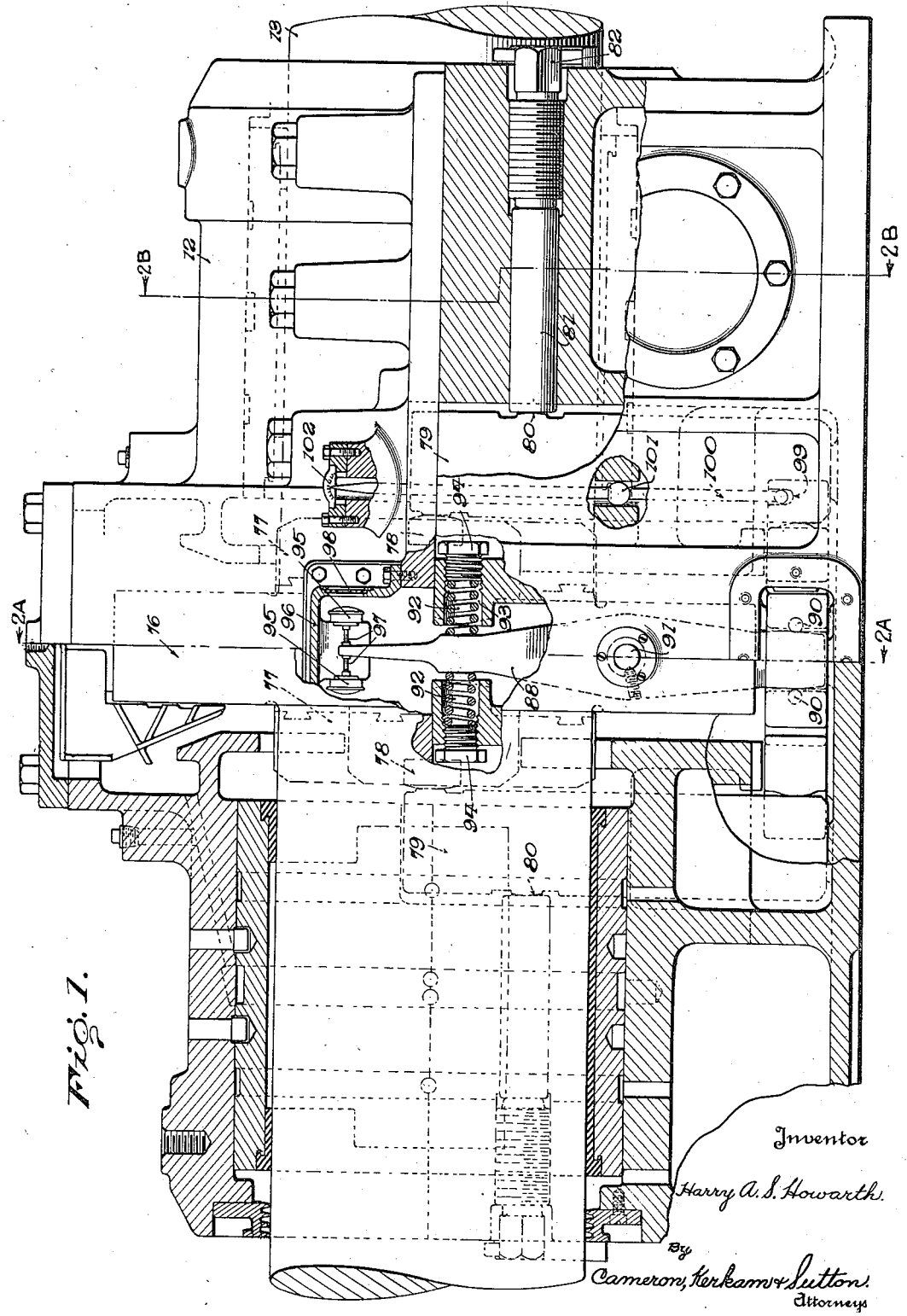
Fig. 1 is a side elevation, partly in section and with certain parts broken away to show details of construction lying in different vertical planes, of one practical form of thrust bearing embodying various features of the present invention.
Figure 2:
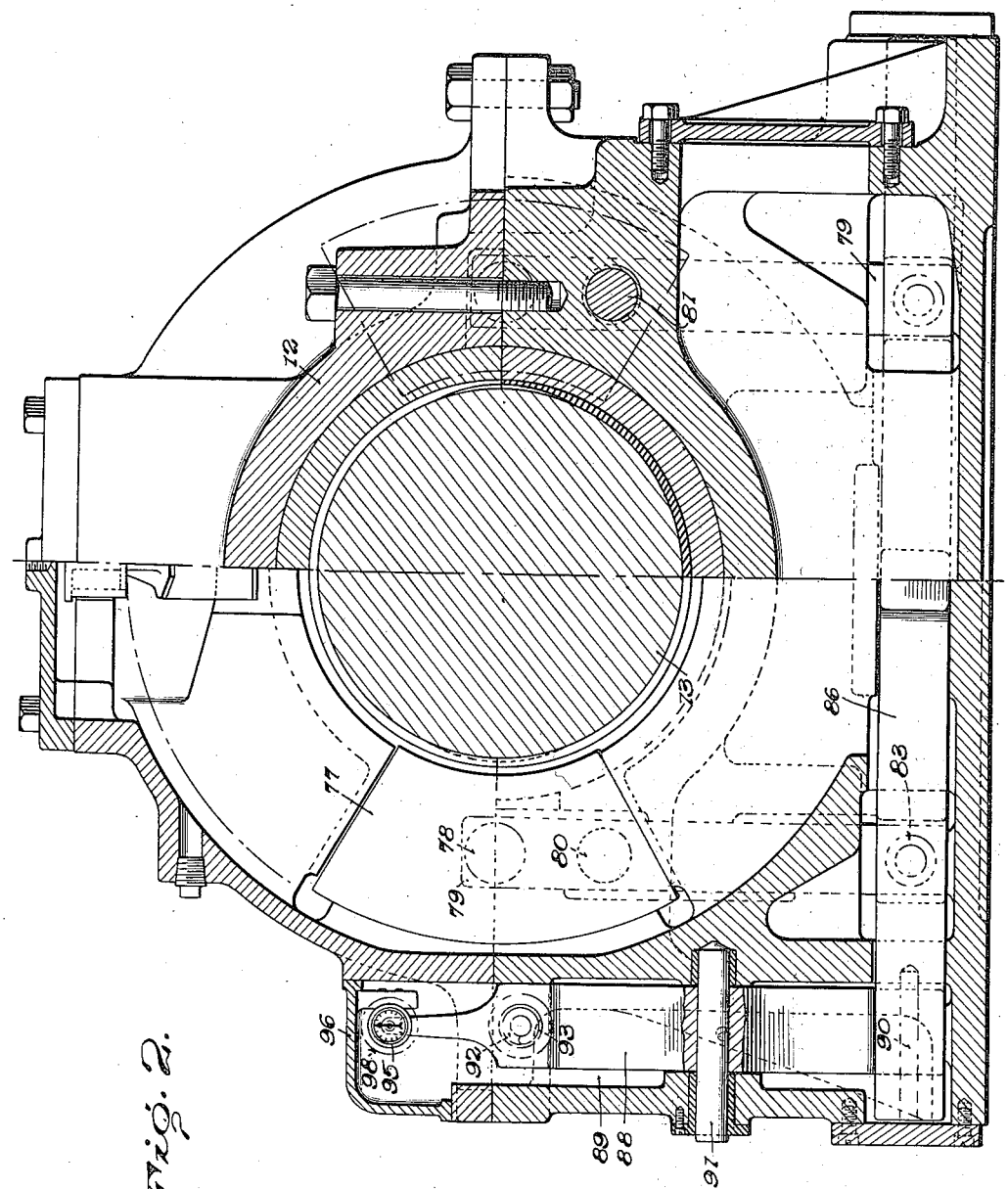
Fig. 2 is a composite cross sectional view of the embodiment shown in Fig. 1, the left half being taken substantially on the line 2A—2A of Fig. 1, while the right half is taken substantially on line 2B—2B of Fig. 1, certain parts being omitted and others shown in full for the sake of clearness.
Figure 3:
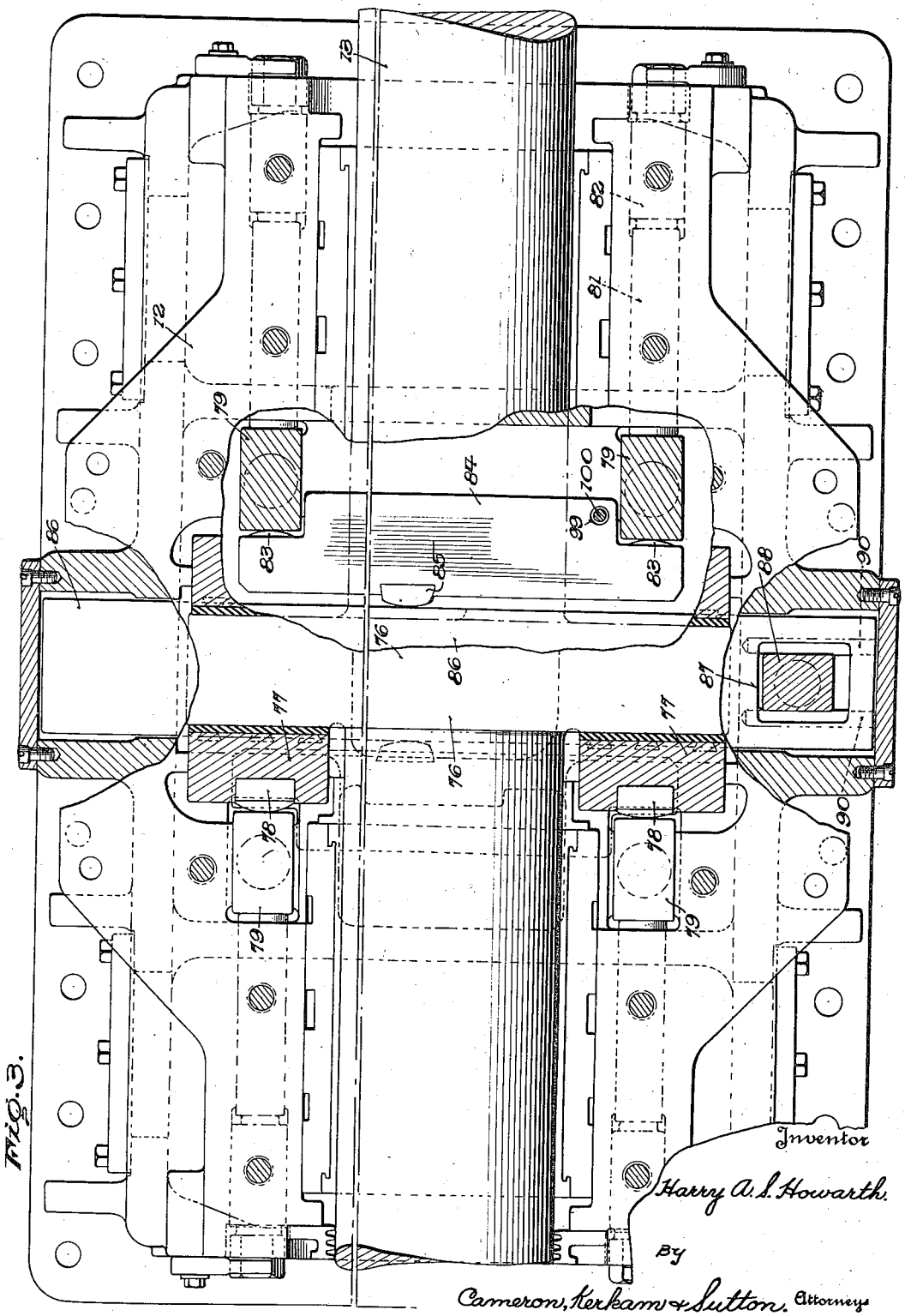
Fig. 3 is a sectional plan view taken substantially on a horizontal plane through the axis of the shaft but with certain parts shown in full and other parts broken away in the interest of clearness.

Referring now to Figs. 1, 2 and 3, there is disclosed therein a practical commercial form of thrust bearing for a horizontal shaft embodying both means on each side of the thrust collar for equalizing the thrusts on those shoes which cooperate with the same side of the thrust collar and means for measuring and indicating the direction and amount of the net thrust applied to the thrust bearing. This embodiment also discloses novel means for visually indicating the operative condition of the thrust equalizing mechanism.

As shown, a horizontal shaft 13 which may be rotated in either direction is provided with a suitable thrust collar 76 which is adapted to transmit the thrust upon shaft 13 to a plurality of thrust receiving bearing members or shoes 77 of the well known Kingsbury type which are supported in and ultimately transmit the thrust thus received to a bearing housing 12. The bearing illustrated is of the two-shoe type wherein the pivot inserts 78 of the two shoes 77 on each side of thrust collar 76 lie in a substantially horizontal plane. Since this bearing is double ended so as to take the thrust in either direction of rotation of shaft 13, the thrust receiving mechanism is symmetrical with respect to a plane throught the center of thrust collar 76 perpendicular to the axis of shaft 13.

The pivot insert 78 of each of bearing shoes 77 engages the inner face of the upper end of a rigid vertical thrust transmitting lever 79 which rests upon the bottom of housing 12 and is fulcrumed as at 80, a point on the outer face thereof intermediate the upper and lower ends, by means of a thrust pin 81 and jackscrew 82. Since jackscrew 82 is adjustably threaded into bearing housing 12, this arrangement of elements provides not only a fulcrum for vertical lever 79 but also means for adjusting the position of bearing shoes 77 with respect to thrust collar 76.

At its lower end each vertical lever 79 is in engagement at its inner face with a suitable pivot insert 83 carried by one end of an equalizing lever 84 which extends transversely to and beneath shaft 13 and is fulcrumed at its mid-point by a pivot insert 85 which lies substantially in a vertical plane through the axis of said shaft. The thrusts upon the two shoes of each pair on each side of thrust collar 76 are equalized by equalizing lever 84 in a manner similar to that previously described in connection with the embodiments of Figs. 5–8. The pivot inserts 85 forming the fulcrum points of the two equalizing levers 84 rest against the opposite sides of a rigid bar member 86 which extends transversely to and beneath the axis of shaft 13 and is supported in the bottom of housing 12 so as to be bodily movable laterally in response to the thrusts applied thereto through pivot members 85. The normal no-load position of transverse bar member 86 is substantially in the vertical plane of thrust collar 76, and since the equalized thrusts from the pair of shoes on each side of collar 76 are transmitted to the opposite sides of said bar member, the lateral bodily displacement of said member from its normal no-load position will conform with the difference in pressures applied thereto at the opposite sides thereof by the axially alined fulcra of the equalizing levers 84, until the resultant of pressure is balanced by the indicating mechanism next to be described, and hence this displacement will be in proportion to the net thrust load applied to the bearing.

In order that the net thrust load may be measured and visually indicated, suitable means have been provided for transmitting and multiplying to an easily perceptible degree the lateral bodily movement of bar member 86. As shown, one end of said bar member is provided with a suitable recess 87 into which extends the lower end of a vertical measuring lever 88 which is housed in a cored well 89 formed contrally in one side of bearing housing 12. This lower end of measuring lever 88 may be made substantially rigid with transverse bar member 86 as by suitable binding screws indicated at 90. Indicating lever 88 is fulcrumed on a suitable pivot pin or stub shaft 91 fixedly mounted in bearing housing 12 intermediate the ends of said lever, and is normally maintained in or resiliently urged toward a vertical position co-planar with thrust collar 76 and the normal no-load position of bar member 86 by a pair of coil springs 92 housed in suitable recesses 93 in the wall of well 89 and engaging the opposite sides of lever 88 intermediate its upper end and pivot pin 91. The pressure of springs 92 may be adjusted by suitable screw plugs 94 threaded into the outer ends of recesses 93.

It will be evident that with this construction any lateral bodily movement of bar member 86 will be transmitted to and indicated by the movement of lever 88 about its fulcrum point. Accordingly, suitable means have been provided cooperating with the upper end of said lever for measuring and visually indicating on a readable scale the amount of said movement of bar 86, which in turn is proportional to the net thrust exerted upon the bearing. As shown, a pair of dial indicators 95 are supported from a cover member 96 for cored well 89, one on each side of the upper end of indicating lever 88 and each having an actuating stem 97 in engagement with one side of said lever. Indicators 95 may be of any desired construction containing the usual multiplying mechanism, and cover 96 is provided with a pair of windows 98 through which the readings of indicators 95 may be observed. The dials of indicators 95 are preferably calibrated in terms of net thrust load.

As pointed out above, the positions of bearing shoes 77 may be adjusted through the medium of vertical thrust transmitting levers 79 by means of jackscrews 82 and thrust pins 81. However, if such adjustment should be made carelessly, it is possible that the equalizing lever 84 associated with the shoes being adjusted may be moved out of its normal no-load position, which is perpendicular to the axis of shaft 13, to an extent such that some portion of said lever may come to bear against some fixed part of the thrust bearing housing and thus render the equalizing mechanism inoperative. Novel means have therefore been provided for indicating the operative, or relative, position of each of equalizing levers 84 with respect to the normal position thereof. In the form shown, one end of each equalizing lever 84 is provided with a suitable recess 99 in which is mounted the lower end of a vertical indicating arm 100 which is fulcrumed intermediate its ends as at 101 in the thrust bearing housing 12 and the upper end of which registers with a suitable scale 102 which is preferably visible from the outside of bearing housing 12. With this construction, as equalizing lever 84 is moved about its fulcrum 85, indicating arm 100 measures the extent of said movement on scale 102, and by a proper marking of said scale the angularity of equalizing lever 84 with respect to the axis of shaft 13 may be determined at any time. Limiting marks may also be placed to indicate when said lever has moved so far out of the normal as to become inoperative by reason of contact with a fixed portion of the bearing housing. By utilizing a ball fulcrum and a removable scale member which also acts as a cap over the indicating mechanism, as shown in Fig. 1, this mechanism may be readily assembled and disassembled without interfering with any of the other parts of the bearing. It will be understood that one such indicator is provided for each equalizing lever.

There is thus provided by the present invention an extremely simple, rugged and efficient mechanism for equalizing the thrusts exerted upon the bearing members or shoes of a thrust bearing, which mechanism is especially well adapted for use with bearings embodying two shoes located at substantially opposite points with respect to the axis of the shaft. This novel equalizing mechanism employs a compact arrangement of simple levers which may be readily attached and detached to and from a thrust bearing as a unit. The invention also includes the provision of means for measuring and indicating the net thrust load applied to a thrust bearing where the shaft is adapted for rotation in both directions and bearing members are required on both sides of the thrust collar. This net thrust measuring mechanism is also structurally simple and efficient in operation, and is especially well adapted for use in a bearing which also employs the equalizing mechanism previously mentioned. Novel means have also been provided by the present invention for continuously indicating the operative condition of the thrust equalizing members, so that this mechanism may not be inadvertently rendered inoperative due to carelessness in adjustment of the shoes or to breakage of any of the parts. The commercial form of the present invention embodying all of these various features provides an adjustable two-shoe equalizing thrust bearing for a horizontal shaft rotatable in either direction which is capable of operation in a manner superior to bearings of this general character previously known, and which continuously provides visible indications of the operating conditions of the bearing of a nature hitherto not attained.

It will be obvious that the invention is not limited to the forms shown in the drawings, but is capable of a variety of mechanical embodiments. For example, any other suitable type of means for showing the net thrust may be substituted for the forms shown and described, and other forms of force transmitting mechanisms may be substituted for the specific lever arrangements illustrated. Moreover, the coil spring means provided for maintaining the various indicating mechanisms in central position may be replaced by other suitable means capable of attaining the same results. Also, although the invention has been described with particular reference to bearings of the Kingsbury type, it will be understood that it is not limited to this or any other specific type of bearing but is capable of a variety of different applications. Furthermore, various features described may be used separately or in combination with other features within the scope of the invention. The constructions described and illustrated as adapted for application to existing bearings may, if desired, be built into bearings as originally constructed. Various other changes, which will now be apparent to those skilled in the art, may be made in the form, details of construction and arrangement of the parts without departing from the spirit of the invention, and reference is therefore to be had to the appended claims for a definition of the limits of the invention.

What is claimed is:
1. In a thrust bearing of the type having a thrust collar and a pair of thrust receiving bearing members cooperating with a face of said collar and located at opposite points with respect to the shaft, means for equalizing the thrusts on said members comprising a substantially straight equalizing lever extending transversely to the axis of the shaft and having a fulcrum intermediate its ends, and means including thrust pins for transmitting the thrusts exerted on said bearing members to the opposite ends of said equalizing lever.

2. In a thrust bearing of the type having a thrust collar and a pair of thrust receiving bearing members cooperating with a face of said collar and located at opposite points with respect to the shaft, means for equalizing the thrusts on said members comprising a substantially straight lever member extending transversely to the axis of the shaft and having a fulcrum intermediate its ends, and means including levers for transmitting the thrusts exerted on said bearing members to said lever member at points on opposite sides of the fulcrum thereof.

3. In a thrust bearing of the type having a thrust collar and a pair of thrust receiving bearing members cooperating with a face of said collar and located at opposite points with respect to the shaft, means for equalizing the thrusts on said members comprising a rigid bar-like lever member extending transversely to the axis of the shaft and having a fixed fulcrum at its mid-point, and means for transmitting the thrusts exerted on said bearing members to the opposite ends of said lever member.

4. In a horizontal thrust bearing of the type having a thrust collar and a pair of thrust receiving bearing members cooperating with a face of said collar and located at opposite points with respect to the shaft, means for equalizing the thrusts on said members comprising a rigid bar-like equalizing lever extending transversely to the axis of the shaft and having a fulcrum at its mid-point fixed with respect to the housing of said bearing and in the vertical plane passing through the axis of said shaft, and means for transmitting the thrusts exerted on said bearing members to the opposite ends of said equalizing lever.

5. In a thrust bearing of the type having a thrust collar and a pair of thrust receiving bearing members cooperating with a face of said collar and located at opposite points with respect to the shaft, means for equalizing the thrusts on said members comprising a rigid bar-like equalizing lever extending transversely to the axis of the shaft and having a fulcrum at its mid-point fixed with respect to the housing of said bearing, and levers for transmitting the thrusts exerted on said bearing members to said equalizing lever at points equidistant from and on opposite sides of the fulcrum thereof.

6. In a horizontal thrust bearing of the type having a thrust collar and a pair of thrust receiving bearing members cooperating with a face of said collar and located at opposite points with respect to said shaft, means for equalizing the thrusts on said members comprising a rigid equalizing bar extending transversely to the axis of the shaft and having a fulcrum at its mid-point fixed with respect to the housing of said bearing and in the vertical plane passing through the axis of said shaft, and levers for transmitting the thrusts exerted on said bearing members to the opposite ends of said rigid equalizing bar.

7. In a thrust bearing of the type having a thrust collar and a pair of thrust receiving bearing members cooperating with a face of said collar and located at opposite points with respect to the shaft, means for equalizing the thrusts on said members comprising an equalizing lever extending transversely to the axis of the shaft and having a fulcrum intermediate its ends, and means for transmitting a predetermined fraction of the thrusts exerted on said bearing members to the opposite ends of said equalizing lever including a pair of lever members perpendicular to and engaging the ends of said equalizing lever, means for establishing a fixed fulcrum for each of said pair of lever members and means for moving each of said lever members about its fulcrum in response to the thrust exerted upon one of said bearing members.

8. In a thrust bearing of the type having a thrust collar and a pair of thrust receiving bearing members cooperating with a face of said collar and located at opposite points with respect to the shaft, means for equalizing the thrusts on said members comprising a substantially straight equalizing lever extending transversely to the axis of the shaft and having a fulcrum intermediate its ends, a pair of substantially straight lever members in engagement with the opposite ends of said equalizing lever, a fulcrum for each of said lever members fixed with respect to the housing of said bearing, and means for transmitting the thrust exerted on each of said bearing members to one of said lever members.

9. In a horizontal thrust bearing of the type having a thrust collar and a pair of thrust receiving bearing members cooperating with a face of said collar and located at opposite points with respect to the shaft, means for equalizing the thrusts on said members comprising a horizontal rigid bar-like equalizing lever transverse to the axis of the shaft and having a fulcrum at its mid-point in the vertical plane through said axis, a pair of vertical rigid bar-like lever members perpendicular to said equalizing lever and each engaging one end thereof, a fixed fulcrum for each of said lever members, and means for transmitting the thrust exerted on each of said bearing members to one of said vertical lever members.

10. A two-shoe equalized thrust bearing for a horizontal shaft having a thrust collar and comprising a pair of thrust receiving bearing shoes cooperating with a face of said collar and located at opposite points in a horizontal plane with respect to said shaft, a horizontal equalizing lever transverse to said shaft and having a fulcrum at its mid-point in the vertical plane passing through the axis of said shaft, and a lever associated with each of said bearing shoes for transmitting the thrust exerted thereon to one end of said equalizing lever.

11. In a thrust bearing for a horizontal shaft, having a thrust collar on said shaft and a plurality of thrust receiving bearing shoes in engagement with each face of said thrust collar, unitary means for measuring the net thrust load exerted on all of said shoes irrespective of the direction of rotation of said shaft including a single member to which is transmitted thrust from both faces of said thrust collar and means for indicating the movement of said member.

12. In a thrust bearing of the type embodying a thrust collar and a plurality of thrust receiving bearing elements on each side thereof, a movable member mounted in the bearing housing, means for moving said member in proportion to the resultant of the thrusts applied to the bearing shoes on both sides of said collar, and means for balancing said resultant and indicating the resultant movements of said member as a measure of the net thrust load exerted on said bearing.

13. In a thrust bearing for a shaft having a thrust collar and a plurality of bearing shoes in thrust receiving engagement with each face of said collar, a bodily movable member mounted in the housing of said bearing and operatively connected to receive the thrusts from all of said shoes irrespective of the direction of rotation of said shaft, and means for balancing the resultant of said thrust and indicating the resultant movements of said member in response to said thrusts as a measure of the net thrust load exerted on said bearing.

14. In a thrust bearing of the type embodying a thrust collar and a plurality of thrust receiving bearing shoes on each side thereof, a movable member mounted in the bearing housing, means for transmitting to said member the thrust exerted on the shoes on one side of said collar whereby said member is urged in one direction, means for transmitting to said member the thrust exerted on the shoes on the other side of said collar whereby said member is urged in the opposite direction, means for opposing movement of said member, and means for indicating the resultant movements of said member as a measure of the net thrust load exerted on said bearing.

15. In a thrust bearing for a horizontal shaft having a thrust collar on said shaft and a plurality of thrust receiving bearing shoes in engagement with each face of said thrust collar, means for measuring the net thrust exerted on all of said shoes irrespective of the direction of rotation of said shaft comprising a rigid lever associated with each of said shoes, each of said levers having a fixed fulcrum, means for transmitting the thrust exerted on each of said shoes to its associated lever, a movable member to which all of said levers are operatively connected, means for opposing movement of said member and means for indicating the resultant movements of said member as a measure of the net thrust load exerted on said bearing.

16. In a thrust bearing for a shaft having a thrust collar and a plurality of bearing members in thrust receiving engagement with each face of said thrust collar, levers cooperating with the bearing members at both faces of said thrust collar for combining the pressures exerted on all of said bearing members and means actuated by said levers for indicating the net load exerted thereon irrespective of the direction of rotation of said shaft.

17. In a thrust bearing for a shaft having a thrust collar and a plurality of bearing members in thrust receiving engagement with each face of said thrust collar, a lever associated with each of said bearing members and adapted to be moved about its fulcrum in response to the thrust exerted upon its associated bearing member, means for opposing movement of said levers, and means for indicating the resultant movements of all of said levers as a measure of the net thrust load applied to said bearing.

18. In a thrust bearing for a shaft having a thrust collar and a plurality of bearing members in thrust receiving engagement with each face of said thrust collar, a lever associated with each of said bearing members and having a fulcrum fixed with respect to the bearing housing, means for transmitting the thrust from each of said bearing members to its associated lever, a member mounted in said bearing housing for movement in either direction, means operatively connecting the free end of each of said levers with said member whereby the latter is moved in response to the resultant of the movements of said levers, means for opposing movement of said member, and means for indicating the resultant movements of said member as a measure of the net thrust load on said bearing.

19. In a thrust bearing for a shaft having a thrust collar and a pair of bearing shoes in thrust receiving engagement with each face of said thrust collar, lever means associated with each pair of said bearing shoes, each of said lever means being fulcrumed adjacent one end and receiving the thrusts from its associated shoes at points intermediate the fulcrumed end and the opposite end thereof, a member mounted in the bearing housing for movement in either direction, means operatively connecting said lever means with said member whereby the latter is moved in response to the resultant of the movements of said lever means, resilient means for opposing movement of said member and means for indicating the resultant movements of said member as a measure of the net thrust load on said bearing.

20. In a thrust bearing for a shaft having a thrust collar and a plurality of bearing members in thrust receiving engagement with each face of said thrust collar, means for measuring the net thrust exerted on all of said bearing members irrespective of the direction of rotation of said shaft comprising a member mounted in the bearing housing for movement in either direction, means for transmitting the thrust on each of said bearing members to said member, resilient means tending to urge said member to a normal central position and means for indicating the displacement of said member from its normal position as a measure of the net thrust load on said bearing.

21. In a thrust bearing for a shaft having a thrust collar and a plurality of bearing members in thrust receiving engagement with each face of said thrust collar, means for measuring the net thrust exerted on all of said bearing members irrespective of the direction of rotation of said shaft comprising a bar transverse to the axis of said shaft and mounted in the bearing housing for lateral movement in either direction, means tending to maintain said bar in a central position, means for transmitting the thrust on each of said bearing members to said bar, and means for indicating the lateral displacement of said bar from its normal position as a measure of the net thrust load on said bearing.

22. In a thrust bearing for a shaft having a thrust collar and a plurality of bearing members in thrust receiving engagement with each face of said thrust collar, means for measuring the net thrust exerted on all of said bearing members irrespective of the direction of rotation of said shaft comprising a horizontal bar transverse to the axis of said shaft and mounted in the bearing housing for lateral movement in either direction, the normal position of said bar being substantially co-planar with said thrust collar, means tending to maintain said bar in its normal position, means for transmitting the thrust on each of said bearing members to said bar, and means for indicating the lateral displacement of said bar from its normal position as a measure of the net thrust load on said bearing.

23. In a thrust bearing for a shaft having a thrust collar and a plurality of bearing members in thrust receiving engagement with each face of said thrust collar, means on each side of said thrust collar for equalizing the thrusts on the bearing members at that side of said collar, and a single means for combining the pressures existing on the opposite sides of said collar and indicating the net mean load exerted on all of said bearing members irrespective of the direction of rotation of said shaft.

24. In a thrust bearing for a horizontal shaft having a thrust collar and a pair of bearing shoes in thrust receiving engagement with each face of said thrust collar, means cooperating with the shoes of each pair for equalizing the thrusts to the shoes of said pair, and a single means for indicating the net mean thrust load exerted on both pairs of said shoes irrespective of the direction of rotation of said shaft.

25. In a thrust bearing for a shaft having a thrust collar and a pair of bearing shoes in thrust receiving engagement with each face of said thrust collar, means cooperating with the shoes of each pair for equalizing the thrusts on the shoes of said pair, and means for measuring the net mean thrust exerted on all of said shoes irrespective of the direction of rotation of said shaft including a bar mounted in the bearing housing for lateral movement in either direction and extending transversely to the axis of the shaft, means for transmitting to said bar the equalized thrusts from both of said pairs of bearing shoes, means tending to maintain said bar in a normal position, and means for indicating the lateral displacements of said bar from its normal position in response to the thrusts transmitted thereto as a measure of the net mean thrust load on said bearing.

26. In a thrust bearing for a shaft having a thrust collar and a pair of bearing shoes in thrust receiving engagement with each face of said thrust collar, means cooperating with the shoes of each pair for equalizing the thrusts on the shoes of said pair including a lever and means for transmitting the thrusts from said shoes to the opposite ends of said lever, and means for measuring the net mean thrust exerted on all of said shoes irrespective of the direction of rotation of said shaft including a bar mounted in the bearing housing for lateral movement in either direction and extending transversely to the axis of the shaft, the fulcrum points of said levers being on the opposite sides of said bar, means tending to maintain said bar in a normal position, and means for indicating the displacement of said bar from its normal position in response to the thrusts transmitted through said fulcrum points.

27. In a thrust bearing for a shaft having a thrust collar and a plurality of bearing members in thrust receiving engagement with each face of said thrust collar, a bar mounted in the bearing housing for lateral movement in either direction and extending transversely to the axis of the shaft, means for transmitting to said bar the thrusts received by all of said bearing members whereby said bar is moved laterally in response to the resultant net thrust, and means for measuring the displacement of said bar from its normal position as a measure of said net thrust comprising a lever fixedly fulcrumed in said bearing housing and operatively connected to said bar, means tending to maintain said bar and lever in a normal position and means actuated by said lever for indicating the movements of said bar and lever.

28. In a thrust bearing for a horizontal shaft having a thrust collar and a pair of bearing shoes in thrust receiving engagement with each face of said thrust collar, a horizontal bar mounted for lateral movement in either direction within the bearing housing and extending transversely of the axis of the shaft, the normal position of said bar being substantially co-planar with said collar, means for transmitting to said bar thrusts received by all of said bearing shoes whereby said bar is moved laterally in response to the resultant net thrust, and means for measuring the displacement of said bar from its normal position as a measure of said net thrust comprising a lever fixedly fulcrumed in said bearing housing and having one end operatively connected to said bar, the normal position of said lever being substantially vertical and co-planar with said collar and bar, resilient means continually urging said lever to its normal position, and indicating means actuated by the other end of said lever for indicating the movements of said bar and lever.

29. In a thrust bearing for a shaft having a thrust collar and a pair of bearing shoes in thrust receiving engagement with each face of said thrust collar, means cooperating with the shoes of each pair for equalizing the thrusts on the shoes of said pair including an equalizing lever extending transversely to the axis of the shaft and having a fulcrum intermediate its ends and a pair of lever members fulcrumed in the bearing housing and transmitting the thrusts on said shoes to the opposite ends of said equalizing lever, and means for measuring the net amount of the equalized thrusts on said pairs of shoes of said bearing irrespective of the direction of rotation of said shaft.

30. In a thrust bearing for a shaft having a thrust collar and a pair of bearing shoes in thrust receiving engagement with each face of said thrust collar, means cooperating with the shoes of each pair for equalizing the thrusts on the shoes of said pair including an equalizing lever extending transversely to the axis of the shaft and having a fulcrum intermediate its ends and a pair of lever members fulcrumed in the bearing housing and transmitting the thrusts on said shoes to the opposite ends of said equalizing lever, and means for measuring the net amount of the equalized thrusts on said pairs of shoes of said bearing irrespective of the direction of rotation of said shaft including a bar mounted in said bearing housing for lateral movement in either direction and extending transversely to the axis of the shaft, the fulcrum points of said equalizing levers being on the opposite sides of said bar, and means for indicating the lateral displacement of said bar from its normal position in response to the equalized thrusts transmitted through said fulcrum points as a measure of the net mean thrust load on said bearing.

31. In a thrust bearing for a shaft having a thrust collar and a pair of bearing members in thrust receiving engagement with one face of said thrust collar, means for equalizing the thrusts on said members including an equalizing lever extending transversely to the axis of the shaft, to the opposite ends of which lever the thrusts on said bearing members are transmitted, and means for indicating the angularity of said equalizing lever with respect to the axis of said shaft.

32. In a thrust bearing for a shaft having a thrust collar and a pair of bearing members in thrust receiving engagement with one face of said thrust collar, means for equalizing the thrusts on said members including an equalizing lever extending transversely to the axis of the shaft, to the opposite ends of which lever the thrusts on said bearing members are transmitted, and means for indicating the angularity of said equalizing lever with respect to the axis of said shaft comprising an indicator arm fulcrumed intermediate its ends in the bearing housing and having one end thereof secured to one end of said equalizing lever, and scale means cooperating with the other end of said indicator arm.

33. In a thrust bearing for a shaft having a thrust collar and a pair of bearing members in thrust receiving engagement with one face of said thrust collar, means for equalizing the thrusts on said members including an equalizing lever to the opposite ends of which the thrusts on said bearing members are transmitted, the normal no-load position of said lever being perpendicular to the axis of said shaft, and means for indicating the displacement of said lever from said normal position.

34. In a thrust bearing for a shaft having a thrust collar and a pair of bearing shoes in thrust receiving engagement with one face of said thrust collar, an equalizing lever extending transversely to the axis of said shaft, a pair of lever members each engaging one end of said equalizing lever and also receiving the thrust from one of said shoes, means for providing a fulcrum for each of said lever members, the normal no-load position of said equalizing lever when said shoes are properly adjusted being perpendicular to the axis of said shaft, and means for indicating the displacement of said equalizing lever from said normal position.

35. In a thrust bearing of the type embodying a pair of thrust receiving bearing members located at opposite points with respect to the shaft and an equalizing lever extending transversely to said shaft to the opposite ends of which lever the thrusts on said bearing members are applied, means for indicating the angularity of said equalizing lever with respect to the axis of said shaft comprising an indicator arm fulcrumed in the bearing housing and secured to one end of said equalizing lever, and scale means cooperating with said indicator arm.

36. In a thrust bearing of the type embodying a pair of bearing shoes in thrust receiving engagement with one face of a thrust collar and means for adjusting the positions of said shoes, an equalizing lever, levers for receiving the thrusts from both of said shoes and transmitting the same to said equalizing lever, an indicator arm, means for fulcruming said arm in the bearing housing, means for operatively connecting said arm to said equalizing lever, and scale means cooperating with said arm for providing a visible indication of the position of said adjusting means.

37. A self-contained mechanism for equalizing the thrusts transmitted to the bearing members of a thrust bearing, comprising a casing, thrust equalizing elements housed within said casing and so constructed and arranged as to receive and balance the thrusts exerted on said bearing members, and means for detachably connecting said casing and its contained equalizing elements as a unit to the housing of said thrust bearing.

38. A self-contained equalizing mechanism adapted for use with a thrust bearing of the type having thrust receiving bearing members and means for normally transmitting the thrusts therefrom to the thrust bearing housing, comprising a casing, thrust equalizing elements housed within said casing, and means for detachably connecting said casing to the thrust bearing housing in such position that the thrusts from said bearing members are transmitted to said equalizing elements through the agency of said thrust transmitting means.

39. A self-contained mechanism for equalizing the thrusts transmitted to the bearing members of a thrust bearing, comprising a casing, an equalizing lever mounted in said casing and having a fulcrum intermediate its ends, means housed within said casing and adapted to receive the thrusts from said bearing members and to transmit said thrusts to the opposite ends of said equalizing lever, and means for detachably mounting said casing and its contained elements on the thrust bearing housing in position to receive and equalize said thrusts.

40. A self-contained equalizing mechanism adapted for use with a thrust bearing of the type having a pair of bearing members in thrust receiving engagement with one side of a thrust collar and thrust pins for normally transmitting the thrusts from said bearing members to the thrust bearing housing, comprising a casing, an equalizing lever fulcrumed in said casing at a point intermediate its ends, means for receiving the thrusts from said thrust pins and transmitting the same to the opposite ends of said equalizing lever, said casing having an opening therein through which said thrust pins may extend, and means for detachably connecting said casing and its contained elements to the thrust bearing housing in position to receive and equalize said thrusts.

41. A self-contained mechanism for equalizing the thrusts transmitted to the bearing members of a thrust bearing, comprising a casing, an equalizing lever fulcrumed at its mid-point in said casing, a pair of lever members fulcrumed in said housing and in thrust transmitting engagement with the opposite ends of said equalizing lever, and means for attaching and detaching said casing and its contained lever elements as a unit to and from the thrust bearing housing, said casing having an opening therein through which the thrust from each bearing member may be transmitted to one of said last named lever members.

HARRY A. S. HOWARTH.